US012087208B2

(12) United States Patent
Lee et al.

(10) Patent No.: US 12,087,208 B2
(45) Date of Patent: Sep. 10, 2024

(54) DRIVING CONTROLLER, DISPLAY DEVICE AND METHOD OF DRIVING THE SAME

(71) Applicant: Samsung Display Co., Ltd., Yongin-si (KR)

(72) Inventors: Donggyu Lee, Yongin-si (KR); Jae-Hyeon Jeon, Seoul (KR); Jin-Wook Yang, Suwon-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 130 days.

(21) Appl. No.: 17/861,706

(22) Filed: Jul. 11, 2022

(65) Prior Publication Data

US 2023/0086857 A1 Mar. 23, 2023

(30) Foreign Application Priority Data

Sep. 23, 2021 (KR) ........................ 10-2021-0125746

(51) Int. Cl.
*G09G 3/20* (2006.01)
*G09G 3/3233* (2016.01)

(52) U.S. Cl.
CPC ......... *G09G 3/2096* (2013.01); *G09G 3/3233* (2013.01); *G09G 2300/0426* (2013.01); *G09G 2300/0819* (2013.01); *G09G 2300/0842* (2013.01); *G09G 2300/0861* (2013.01); *G09G 2310/0297* (2013.01); *G09G 2310/061* (2013.01); *G09G 2310/08* (2013.01); *G09G 2320/0233* (2013.01); *G09G 2320/0626* (2013.01)

(58) Field of Classification Search
CPC ............... G09G 3/2096; G09G 3/3233; G09G 2300/0426; G09G 2300/0819; G09G 2300/0842; G09G 2300/0861; G09G 2310/0297; G09G 2310/061; G09G 2310/08; G09G 2320/0233; G09G 2320/0626
See application file for complete search history.

(56) References Cited

U.S. PATENT DOCUMENTS

| | | | | |
|---|---|---|---|---|
| 6,356,314 | B1 * | 3/2002 | Takebe ..................... | G09G 5/39 348/568 |
| 9,620,054 | B2 * | 4/2017 | Keum .................... | G09G 5/006 |
| 9,858,854 | B2 | 1/2018 | Seo et al. | |
| 11,172,160 | B2 | 11/2021 | Kim et al. | |
| 2021/0398508 | A1 | 12/2021 | Lee et al. | |

FOREIGN PATENT DOCUMENTS

| | | | |
|---|---|---|---|
| KR | 1020170028479 | A | 3/2017 |
| KR | 1020190098296 | A | 8/2019 |
| KR | 1020210158458 | A | 12/2021 |

* cited by examiner

*Primary Examiner* — Xin Sheng
(74) *Attorney, Agent, or Firm* — CANTOR COLBURN LLP

(57) ABSTRACT

A driving controller of a display device includes a memory that stores an input image signal in response to a control signal, a scan signal generator outputs an internal scan signal in response to the control signal, and a multiplexer outputs one of the input image signal and a storage image signal as an output image signal in response to the control signal and the internal scan signal. The storage image signal is provided from the memory, and the memory outputs the storage image signal in response to the internal scan signal.

17 Claims, 12 Drawing Sheets

FIG. 8A

| Frequency of output frame | Number of cycles | Period(ms) |
|---|---|---|
| 240.0 | 1 | 4.166666667 |
| 120.0 | 2 | 8.333333333 |
| 80.0 | 3 | 12.5 |
| 60.0 | 4 | 16.166666667 |
| 48.0 | 5 | 20.333333333 |
| 40.0 | 6 | 25 |
| 34.3 | 7 | 29.166666667 |
| 30.0 | 8 | 33.333333333 |
| 26.7 | 9 | 37.5 |
| 24.0 | 10 | 41.166666667 |
| 21.8 | 11 | 45.333333333 |
| 20.0 | 12 | 50 |
| 18.5 | 13 | 54.166666667 |
| 17.1 | 14 | 58.333333333 |
| 16.0 | 15 | 62.5 |
| 15.0 | 16 | 66.166666667 |
| ⋮ | ⋮ | ⋮ |
| 1.0 | 240 | 1000 |

FIG. 8B

| Frequency of output frame | Number of cycles | Period(ms) |
|---|---|---|
| 480.0 | 1 | 2.083333333 |
| 240.0 | 2 | 4.166666667 |
| 160.0 | 3 | 6.25 |
| 120.0 | 4 | 8.333333333 |
| 96.0 | 5 | 10.41666667 |
| 80.0 | 6 | 12.5 |
| 68.6 | 7 | 14.5833333 |
| 60.0 | 8 | 16.16666667 |
| 53.3 | 9 | 18.75 |
| 48.0 | 10 | 20.83333333 |
| 43.6 | 11 | 22.91666667 |
| 40.0 | 12 | 25 |
| 36.9 | 13 | 27.08333333 |
| 34.3 | 14 | 29.16666667 |
| 32.0 | 15 | 31.25 |
| 30.0 | 16 | 33.333333333 |
| ⋮ | ⋮ | ⋮ |
| 1.0 | 480 | 1000 |

DRIVING CONTROLLER, DISPLAY DEVICE AND METHOD OF DRIVING THE SAME

This application claims priority to Korean Patent Application No. 10-2021-0125746, filed on Sep. 23, 2021, and all the benefits accruing therefrom under 35 U.S.C. § 119, the content of which in its entirety is herein incorporated by reference.

BACKGROUND

Embodiments of the present disclosure described herein relate to a driving controller and a display device including the same.

An organic light emitting display device among display devices displays an image by using an organic light emitting diode that generates light by the recombination of electrons and holes. The organic light emitting display device has a fast response speed and is driven with low power consumption.

The organic light emitting display device includes pixels connected to data lines and scan lines. In general, the pixels include an organic light emitting diode and a circuit that controls the amount of current flowing into the organic light emitting diode. The organic light emitting diode generates light of a predetermined luminance corresponding to the amount of current delivered from the circuit.

SUMMARY

Embodiments of the present disclosure provide a driving controller and a display device that are capable of stably operating in response to a change in the frequency of an input image signal.

Embodiments of the present disclosure provide a driving method of the display device capable of stably operating in response to a change in the frequency of an input image signal.

According to an embodiment, a driving controller includes: a memory which stores an input image signal in response to a control signal; a scan signal generator which outputs an internal scan signal in response to the control signal; and a multiplexer which outputs one of the input image signal and a storage image signal as an output image signal in response to the control signal and the internal scan signal. The storage image signal is provided from the memory, and the memory outputs the storage image signal in response to the internal scan signal.

In an embodiment, a frequency of the internal scan signal may be different from a frequency of the control signal.

In an embodiment, the control signal may include a vertical synchronization signal. The scan signal generator may output the internal scan signal in response to the vertical synchronization signal.

In an embodiment, a frequency of a first input frame of the input image signal may be different from a frequency of a second input frame of the input image signal successive to the first input frame.

In an embodiment, the internal scan signal may have a predetermined frequency.

In an embodiment, the multiplexer may output the input image signal as the output image signal when the control signal is at an active level and outputs the storage image signal received from the memory as the output image signal when the control signal is at an inactive level and the internal scan signal is at an active level.

According to an embodiment, a display device includes: a display panel including a pixel; a driving controller which receives a control signal and an input image signal and outputs an output image signal, a first control signal, and a second control signal; a data driving circuit which outputs a data signal to the pixel in response to the output image signal and the first control signal; and a scan driving circuit which outputs a scan signal to the pixel in response to the second control signal. The driving controller includes: a memory which stores the input image signal in response to the control signal; a scan signal generator which outputs an internal scan signal in response to the control signal; and a multiplexer which outputs one of the input image signal and a storage image signal as an output image signal in response to the control signal and the internal scan signal. The storage image signal is provided from the memory and the memory outputs the storage image signal in response to the internal scan signal.

In an embodiment, a frequency of the internal scan signal may be different from a frequency of the control signal.

In an embodiment, a frequency of the internal scan signal may be higher than a frequency of the control signal.

In an embodiment, the control signal may include a vertical synchronization signal. The scan signal generator may output the internal scan signal in response to the vertical synchronization signal.

In an embodiment, a frequency of a first input frame of the input image signal may be different from a frequency of a second input frame of the input image signal successive to the first input frame.

In an embodiment, when a frequency of the second input frame is lower than a frequency of the first input frame, the input image signal of the second input frame may include a blank section.

In an embodiment, the multiplexer may output the input image signal as the output image signal when the control signal is at an active level and outputs the storage image signal received from the memory as the output image signal when the control signal is at an inactive level and the internal scan signal is at an active level.

In an embodiment, a frequency of the scan signal output from the scan driving circuit may be identical to a frequency of the internal scan signal output from the scan signal generator.

In an embodiment, the display device may further include: an emission driving circuit which outputs an emission control signal. The scan signal may include a plurality of scan signals, and the scan driving circuit may output a plurality of scan signals to the pixel in response to the second control signal.

In an embodiment, the pixel may include an light emitting element, a first capacitor connected between a first driving voltage line and a first node, a second capacitor between the first node and a second node, a first transistor including a first electrode connected to the first driving voltage line, a second electrode electrically connected to the light emitting element, and a gate electrode connected to the second node, a second transistor including a first electrode connected to a data line which delivers the data signal, a second electrode connected to the first electrode of the first transistor, and a gate electrode which receives a first scan signal among the plurality of scan signals, and a third transistor including a first electrode connected to the second electrode of the first transistor, a second electrode connected to the second node, and a gate electrode which receives a second scan signal among the plurality of scan signals.

According to an embodiment, a method of driving a display device includes: storing an input image signal in a memory in response to a control signal; generating an internal scan signal in response to the control signal; outputting one of the input image signal and a storage image signal as an output image signal in response to the control signal and the internal scan signal, where the storage image signal is provided from the memory; generating a scan signal and providing the scan signal to a pixel; and providing the pixel with a data signal corresponding to the output image signal. The storage image signal is provided from the memory and the memory outputs the storage image signal in response to the internal scan signal.

In an embodiment, a frequency of the internal scan signal may be different from a frequency of the control signal.

In an embodiment, a frequency of the scan signal may be identical to a frequency of the internal scan signal output from a scan signal generator.

In an embodiment, the control signal may include a vertical synchronization signal. A frequency of a first input frame of the input image signal may be different from a frequency of a second input frame of the input image signal successive to the first input frame.

BRIEF DESCRIPTION OF THE FIGURES

The above and other aspects and features of the present disclosure will become apparent by describing in detail embodiments thereof with reference to the accompanying drawings.

FIGS. 8A and 8B are diagrams illustrating the number of cycles in one frame and a period of one frame according to the frequency of an output frame.

DETAILED DESCRIPTION

Figure 1:
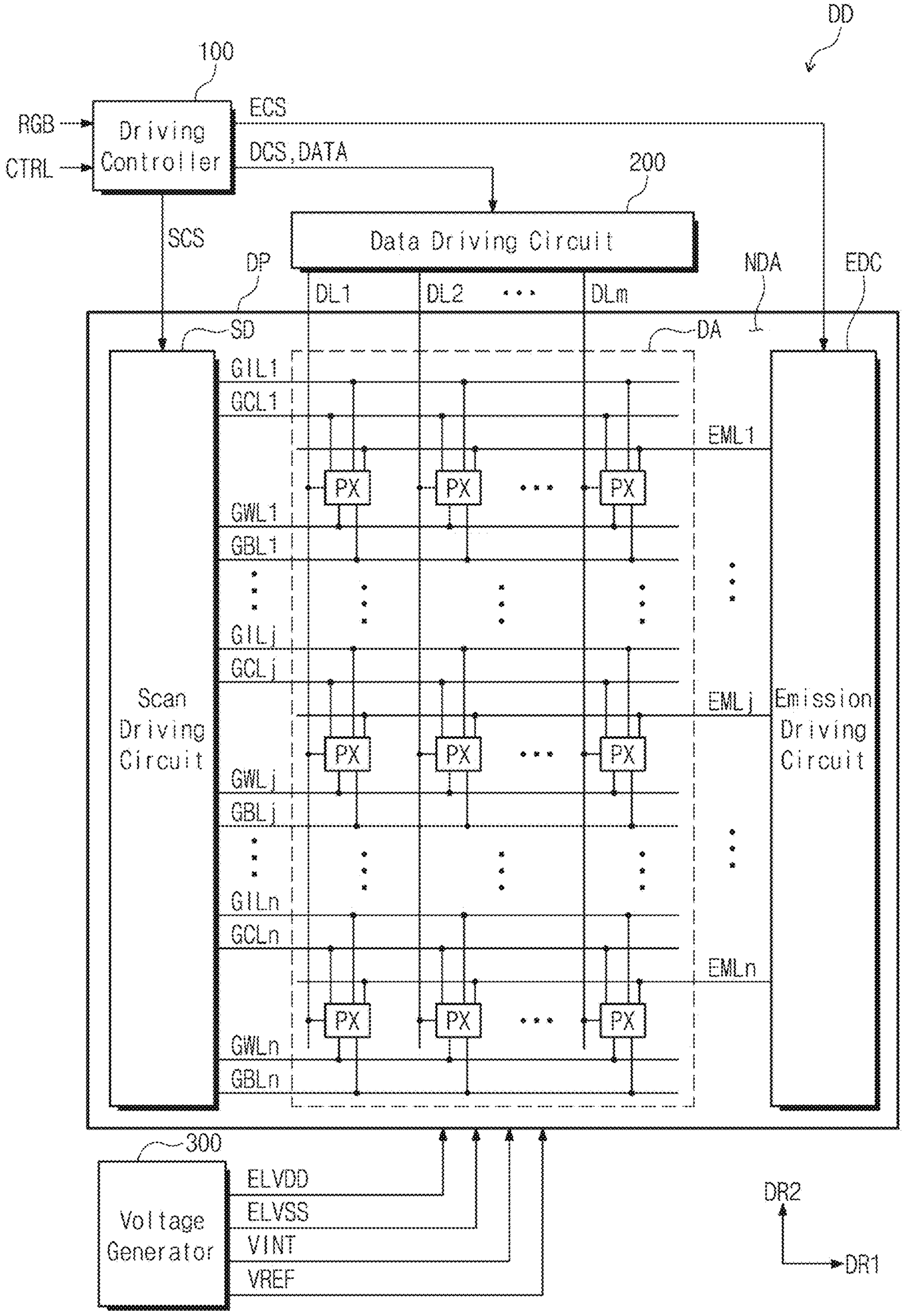
FIG. 1 is a block diagram of a display device, according to an embodiment of the present disclosure.

In the specification, the expression that a first component (or region, layer, part, etc.) is "on", "connected with", or "coupled with" a second component means that the first component is directly on, connected with, or coupled with the second component or means that a third component is interposed therebetween.

Like reference numerals refer to like components. Also, in drawings, the thickness, ratio, and dimension of components are exaggerated for effectiveness of description of technical contents. The term "and/or" includes one or more combinations of the associated listed items.

The terms "first", "second", etc. are used to describe various components, but the components are not limited by the terms. The terms are used only to differentiate one component from another component. For example, without departing from the scope and spirit of the present disclosure, a first component may be referred to as a second component, and similarly, the second component may be referred to as the first component. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or."

Also, the terms "under", "beneath", "on", "above", etc. are used to describe a relationship between components illustrated in a drawing. The terms are relative and are described with reference to a direction indicated in the drawing.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in this specification have the same meaning as commonly understood by those skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, embodiments of the present disclosure will be described with reference to accompanying drawings.

FIG. 1 is a block diagram of a display device, according to an embodiment of the present disclosure.

Referring to FIG. 1, a display device DD includes a display panel DP, a driving controller 100, a data driving circuit 200, and a voltage generator 300.

The driving controller 100 receives an input image signal RGB and a control signal CTRL. The driving controller 100 generates an output image signal DATA by converting a data format of the input image signal RGB so as to be suitable for the interface specification of the data driving circuit 200. The driving controller 100 outputs a scan control signal SCS, a data control signal DCS, and an emission control signal ECS.

According to an embodiment of the present disclosure, the driving controller 100 determines the frequency of the input image signal RGB based on the input image signal RGB and the control signal CTRL and then outputs the output image signal DATA corresponding to a previous input image signal during a blank section of the input image signal RGB. Accordingly, even during the blank section of the input image signal RGB, the output image signal DATA may be provided to the display panel DP.

The data driving circuit 200 receives the data control signal DCS and the output image signal DATA from the driving controller 100. The data driving circuit 200 converts the output image signal DATA into data signals and then outputs the data signals to a plurality of data lines DL1 to DLm to be described later. The data signals refer to analog voltages corresponding to a grayscale value of the output image signal DATA.

The voltage generator 300 generates voltages to operate the display panel DP. In an embodiment, the voltage generator 300 generates a first driving voltage ELVDD, a second driving voltage ELVSS, a reference voltage VREF, and an initialization voltage VINT.

The display panel DP includes scan lines GIL1 to GILn, GCL1 to GCLn, GWL1 to GWLn, and GBL1 to GBLn, emission control lines EML1 to EMLn, the data lines DL1 to DLm and pixels PX. Here, n and m are natural numbers. The display panel DP may further include a scan driving circuit SD and an emission driving circuit EDC.

The display panel DP may include a display area DA and a non-display area NDA positioned outside the display area DA. The pixels PX may be positioned in the display area DA. The scan driving circuit SD and the emission driving circuit EDC may be positioned in the non-display area NDA.

In an embodiment, the scan driving circuit SD may be arranged on a first side of the display panel DP. The scan lines GIL1 to GILn, GCL1 to GCLn, GWL1 to GWLn, and GBL1 to GBLn extend from the scan driving circuit SD in a first direction DR1.

The emission driving circuit EDC is arranged on a second side of the display panel DP. The emission control lines EML1 to EMLn extend from the emission driving circuit EDC in a direction opposite to the first direction DR1.

The scan lines GIL1 to GILn, GCL1 to GCLn, GWL1 to GWLn, and GBL1 to GBLn and the emission control lines EML1 to EMLn are arranged to be spaced apart from one another in a second direction DR2. The data lines DL1 to DLm extend from the data driving circuit 200 in a direction opposite to the second direction DR2 (i.e., downward direction in FIG. 1), and are arranged spaced apart from one another in the first direction DR1.

In the example shown in FIG. 1, the scan driving circuit SD and the emission driving circuit EDC are arranged to face each other with the pixels PX interposed therebetween, but the present disclosure is not limited thereto. For example, the scan driving circuit SD and the emission driving circuit EDC may be positioned adjacent to each other on one of the first side and the second side of the display panel DP in another embodiment. In still another embodiment, the scan driving circuit SD and the emission driving circuit EDC may be implemented with one circuit.

The plurality of pixels PX are electrically connected to the scan lines GIL1 to GILn, GCL1 to GCLn, GWL1 to GWLn, and GBL1 to GBLn, the emission control lines EML1 to EMLn, and the data lines DL1 to DLm. Each of the plurality of pixels PX may be electrically connected to four scan lines and one emission control line. For example, as shown in FIG. 1, pixels in a first row may be connected to the scan lines GIL1, GCL1, GWL1, and GBL1 and the emission control line EML1. Furthermore, pixels in a j-th row may be connected to the scan lines GILj, GCLj, GWLj, and GBLj and the emission control line EMLj.

Each of the plurality of pixels PX includes a light emitting element ED (see FIG. 2) and a pixel circuit PXC (see FIG. 2) controlling the light emission of the light emitting element ED. The pixel circuit PXC may include one or more transistors and one or more capacitors. The scan driving circuit SD and the emission driving circuit EDC may include transistors formed through the same process as the pixel circuit PXC.

Each of the plurality of pixels PX receives the first driving voltage ELVDD, the second driving voltage ELVSS, the reference voltage VREF, and the initialization voltage VINT from the voltage generator 300.

The scan driving circuit SD receives the scan control signal SCS from the driving controller 100. The scan driving circuit SD may output scan signals to the scan lines GIL1 to GILn, GCL1 to GCLn, GWL1 to GWLn, and GBL1 to GBLn in response to the scan control signal SCS. The circuit configuration and operation of the scan driving circuit SD will be described in detail later.

Figure 2:
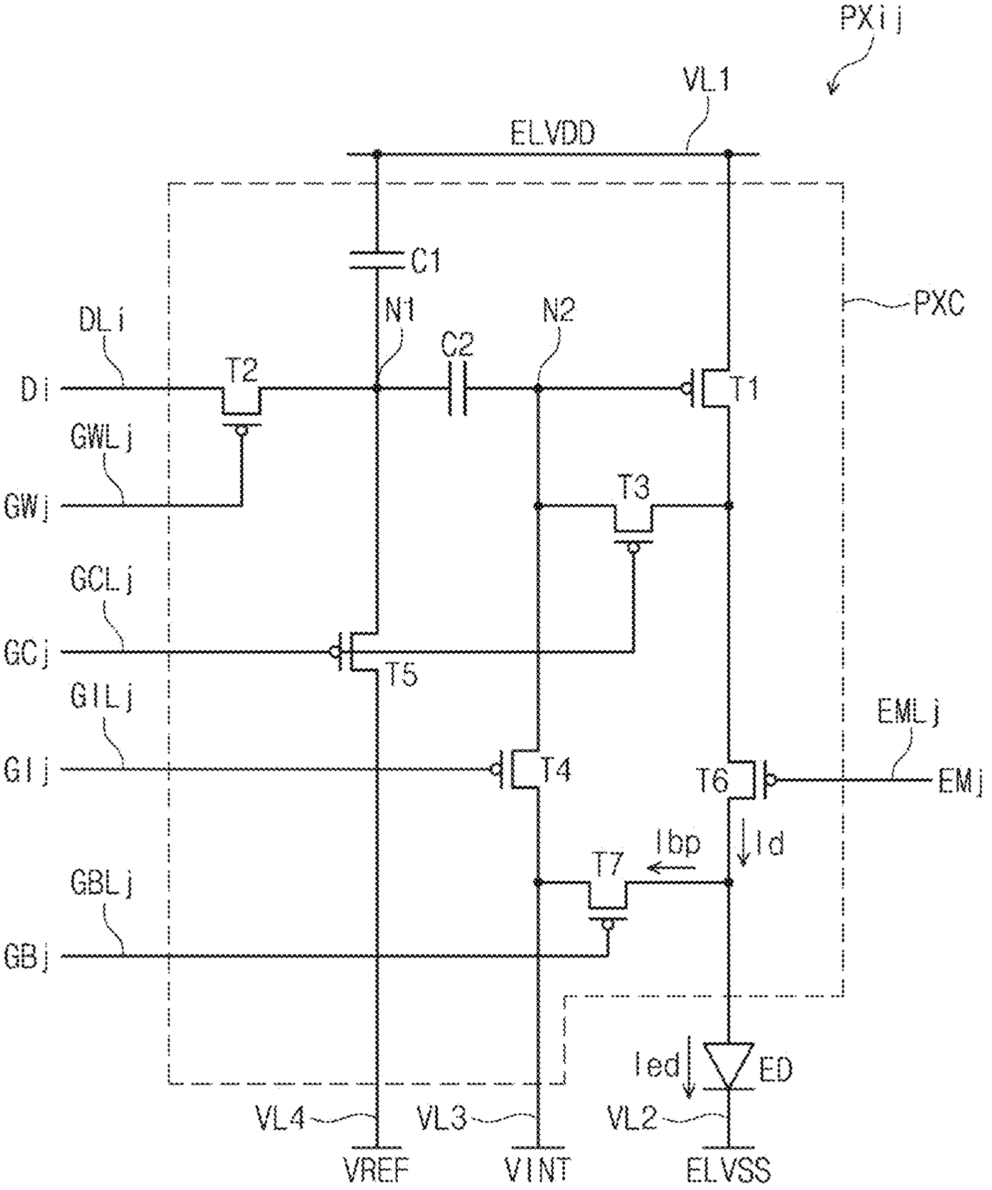
FIG. 2 is an equivalent circuit diagram of a pixel, according to an embodiment of the present disclosure.

FIG. 2 is an equivalent circuit diagram of a pixel, according to an embodiment of the present disclosure.

FIG. 2 illustrates an equivalent circuit diagram of a pixel PXij connected to the i-th data line DLi among the data lines DL1 to DLm, the j-th scan lines GILj, GCLj, GWLj, and GBLj among the scan lines GIL1 to GILn, GCL1 to GCLn, GWL1 to GWLn, and GBL1 to GBLn and the j-th emission control line EMLj among the emission control lines EML1 to EMLn, which are illustrated in FIG. 1.

Each of the plurality of pixels PX shown in FIG. 1 may have the same circuit configuration as the equivalent circuit diagram of the pixel PXij shown in FIG. 2.

Referring to FIG. 2, a pixel PXij of a display device according to an embodiment includes a pixel circuit PXC and at least one light emitting element ED. The pixel circuit PXC includes first to seventh transistors T1, T2, T3, T4, T5, T6, and T7 and a first capacitor C1 and a second capacitor C2. The light emitting element ED may be a light emitting diode. In an embodiment, it is described that the one pixel PXij includes one light emitting element ED.

In the embodiment shown in FIG. 2, each of the first to seventh transistors T1 to T7 is a P-type transistor having a low-temperature polycrystalline silicon ("LTPS") semiconductor layer. However, the present disclosure is not limited thereto. In another embodiment, the first to seventh transistors T1 to T7 may be N-type transistors by using an oxide semiconductor as a semiconductor layer. In still another embodiment, at least one of the first to seventh transistors T1 to T7 may be an N-type transistor, and the remaining transistors may be P-type transistors. Moreover, the circuit configuration of a pixel according to an embodiment of the present disclosure is not limited to FIG. 2. The pixel circuit PXC illustrated in FIG. 2 is only an example. For example, the configuration of the pixel circuit PXC may be modified and implemented.

The scan lines GILj, GCLj, GWLj, and GBLj may deliver scan signals GIj, GCj, GWj, and GBj, respectively. The emission control line EMLj may deliver an emission control signal EMj. The data line DLi delivers a data signal Di. The data signal Di may have a voltage level corresponding to the input image signal RGB input to the display device DD (see FIG. 1). First to fourth driving voltage lines VL1, VL2, VL3, and VL4 may deliver the first driving voltage ELVDD, the second driving voltage ELVSS, the initialization voltage VINT, and the reference voltage VREF, respectively.

The first capacitor C1 is connected between the first driving voltage line VL1 and the first node N1. The second capacitor C2 is connected between the first node N1 and the second node N2.

The first transistor T1 includes a first electrode connected to the first driving voltage line VL1, a second electrode electrically connected to an anode of the light emitting element ED via the sixth transistor T6, and a gate electrode electrically connected to the second node N2. The first transistor T1 may receive the data signal Di, which is delivered through the data line DLi depending on the switching operation of the second transistor T2, at the gate electrode thereof through the second capacitor C2 and then may supply a driving current Id to the light emitting element ED.

The second transistor T2 includes a first electrode connected to the data line DLi, a second electrode connected to the first node N1, and a gate electrode connected to the scan line GWLj. The second transistor T2 may be turned on depending on the scan signal GWj received through the scan line GWLj and then may deliver the data signal Di delivered from the data line DLi to the first node N1.

The third transistor T3 includes a first electrode connected to the second node N2, that is, the gate electrode of the first transistor T1, a second electrode connected to the second electrode of the first transistor T1, and a gate electrode connected to the scan line GCLj. The third transistor T3 may be turned on depending on the scan signal GCj received through the scan line GCLj, and thus, the gate electrode and the second electrode of the first transistor T1 may be connected when the third transistor T3 is turned on, that is, the first transistor T1 may be diode-connected.

The fourth transistor T4 includes a first electrode connected to the second node N2, a second electrode connected to the third driving voltage line VL3 through which the initialization voltage VINT is supplied, and a gate electrode connected to the scan line GILj. The fourth transistor T4 may be turned on depending on the scan signal GIj received through the scan line GILj and then may perform an initialization operation of initializing a voltage of the gate electrode of the first transistor T1 by supplying the initialization voltage VINT to the gate electrode of the first transistor T1.

The fifth transistor T5 includes a first electrode connected to the first node N1, a second electrode connected to the fourth driving voltage line VL4, through which the reference voltage VREF is delivered, and a gate electrode connected to the scan line GCLj. The fifth transistor T5 may be turned on depending on the scan signal GCj received through the scan line GCLj so as to deliver the reference voltage VREF to the first node N1.

The sixth transistor T6 includes a first electrode connected to the second electrode of the first transistor T1, a second electrode connected to the anode of the light emitting element ED, and a gate electrode connected to the emission control line EMLj.

The sixth transistor T6 may be turned on depending on the emission control signal EMj received through the emission control line EMLj. As the sixth transistor T6 is turned on, a current path may be formed between the first driving voltage line VL1 and the light emitting element ED through the first transistor T1 and the sixth transistor T6.

The seventh transistor T7 includes a first electrode connected to the anode of the light emitting element ED, a second electrode connected to the third driving voltage line VL3, and a gate electrode connected to the scan line GBLj. The seventh transistor T7 is turned on depending on the scan signal GBj received through the scan line GBLj, and bypasses a part of a current of the anode of the light emitting element ED to the third voltage line VL3.

The light emitting element ED includes the anode connected to the second electrode of the sixth transistor T6 and a cathode connected to the second driving voltage line VL2.

Figure 3:
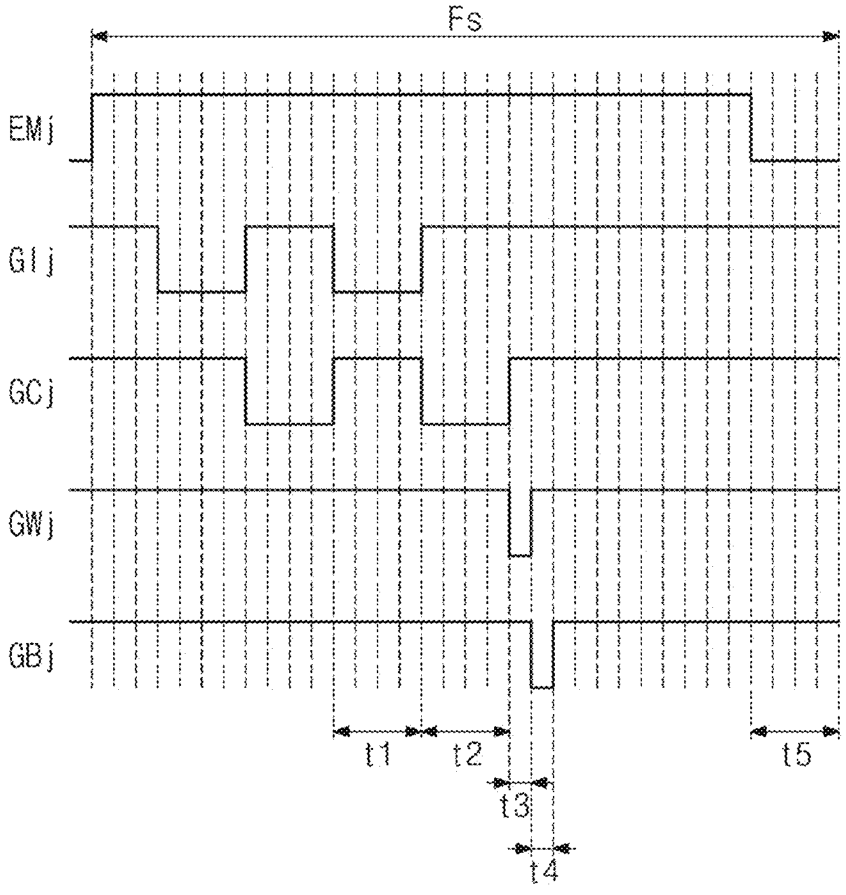
FIG. 3 is a timing diagram for describing an operation of a pixel illustrated in FIG. 2.

FIG. 3 is a timing diagram for describing an operation of a pixel illustrated in FIG. 2. Hereinafter, an operation of a display device according to an embodiment will be described with reference to FIGS. 2 and 3.

Referring to FIGS. 2 and 3, during an initialization interval t1, the scan signal GIj having a low level is provided through the scan line GILj within one frame Fs. When the fourth transistor T4 is turned on in response to the scan signal GIj having a low level, the initialization voltage VINT is supplied to the gate electrode of the first transistor T1 through the fourth transistor T4 so as to initialize the first transistor T1.

Next, when the scan signal GCj having a low level is supplied through the scan line GCLj during a compensation interval t2, the third transistor T3 is turned on. The first transistor T1 is diode-connected by the third transistor T3 turned on and is forward-biased. Accordingly, the potential of the second node N2 may be set to a difference (ELVDD−Vth) between the first driving voltage ELVDD and a threshold voltage (referred to as "Vth") of the first transistor T1.

Furthermore, the second transistor T5 is turned on by the scan signal GCj having a low level. The reference voltage VREF is supplied to the first node N1 by the fifth transistor T5 turned on.

The initialization interval t1 and the compensation interval t2 within one frame may be repeated twice or more to minimize the influence of the data signal Di during the previous frame in the pixel PXij.

During a programming interval t3, the scan signal GWj having a low level is provided through the scan line GWLj. The second transistor T2 is turned on in response to the scan signal GWj having a low level, and thus the data signal Di is delivered to the first node N1 through the second transistor T2. At this time, the potential of the second node N2 increases by a voltage level of the data signal Di. In the case, a compensation voltage, which is obtained by reducing the voltage of the data signal Di supplied from the data line DLi by a threshold voltage of the first transistor T1, is applied to the gate electrode of the first transistor T1. That is, a gate voltage applied to the gate electrode of the first transistor T1 may be a compensation voltage.

During a bypass interval t4, the seventh transistor T7 is turned on by receiving the scan signal GBj having a low level through the scan line GBLj. A part of the driving current Id may be drained through the seventh transistor T7 as the bypass current Ibp.

When the light emitting element ED emits light under the condition that a minimum current of the first transistor T1 flows as a driving current for the purpose of displaying a black image, the black image may not be normally displayed. Accordingly, the seventh transistor T7 in the pixel PXij according to an embodiment of the present disclosure may drain (or disperse) a part of the minimum current of the first transistor T1 to a current path, which is different from a current path to the light emitting element ED, as the bypass current Ibp. Herein, the minimum current of the first transistor T1 means a current flowing under the condition that a gate-source voltage of the first transistor T1 is smaller than the threshold voltage, that is, the first transistor T1 is turned off. As a minimum driving current (e.g., a current of 10 picoamperes (pA) or less) is delivered to the light emitting element ED, with the first transistor T1 turned off, an image of black luminance is expressed. When the minimum driving current for displaying a black image flows, the influence of a bypass transfer of the bypass current Ibp may be great; on the other hand, when a large driving current for displaying an image such as a normal image or a white image flows, there may be almost no influence of the bypass current Ibp. Accordingly, when a driving current for displaying a black image flows, a light emitting current Ied of the light emitting element ED, which corresponds to a result of subtracting the bypass current Ibp drained through the sixth transistor T7 from the driving current Id, may have a minimum current amount to such an extent as to accurately express a black image. Accordingly, a contrast ratio may be improved by implementing an accurate black luminance image by using the seventh transistor T7. In an embodiment, the bypass signal is the scan signal GBj having a low level, but is not necessarily limited thereto.

Next, during a light emitting interval t5, the sixth transistor T6 is turned on by the emission control signal EMj having a low level. In this case, the driving current Id is generated depending on a voltage difference between the gate voltage of the gate electrode of the first transistor T1 and the first driving voltage ELVDD and is supplied to the light emitting element ED through the sixth transistor T6, and the current Ted flows through the light emitting element ED.

Figure 4A:
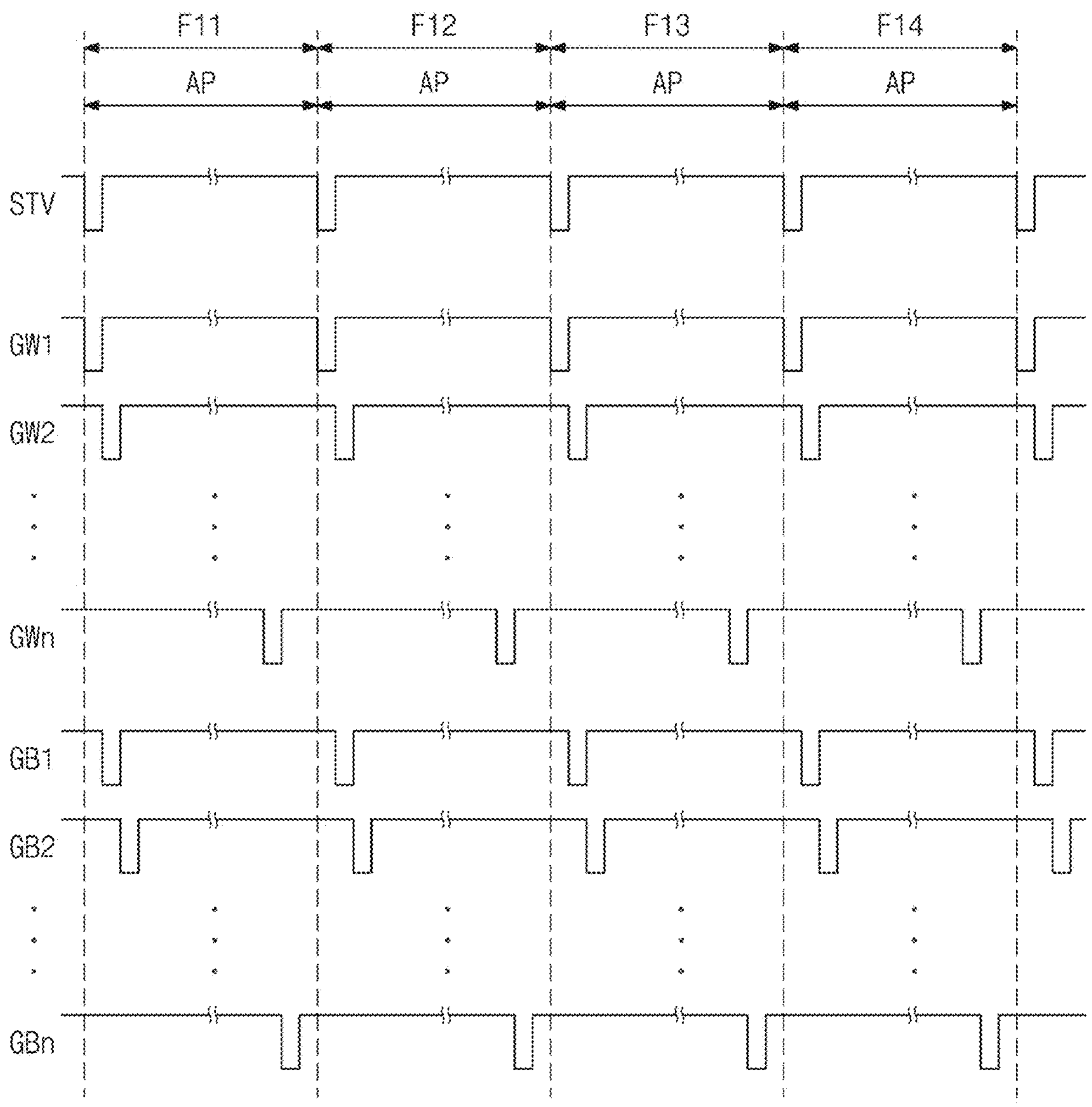
FIGS. 4A, 4B, and 4C are timing diagrams for describing an operation of a display device.
Figure 4B:
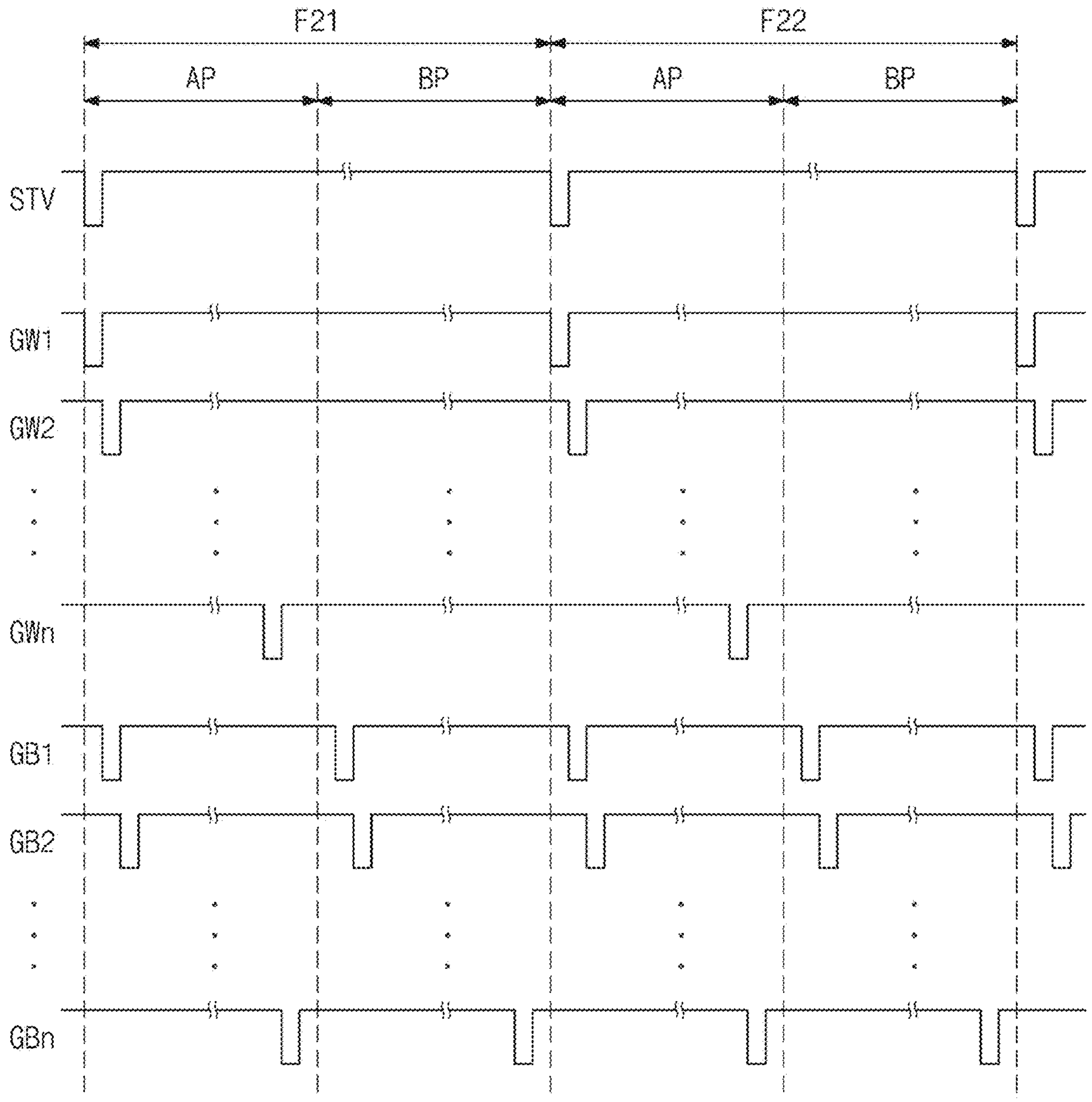
Figure 4C:
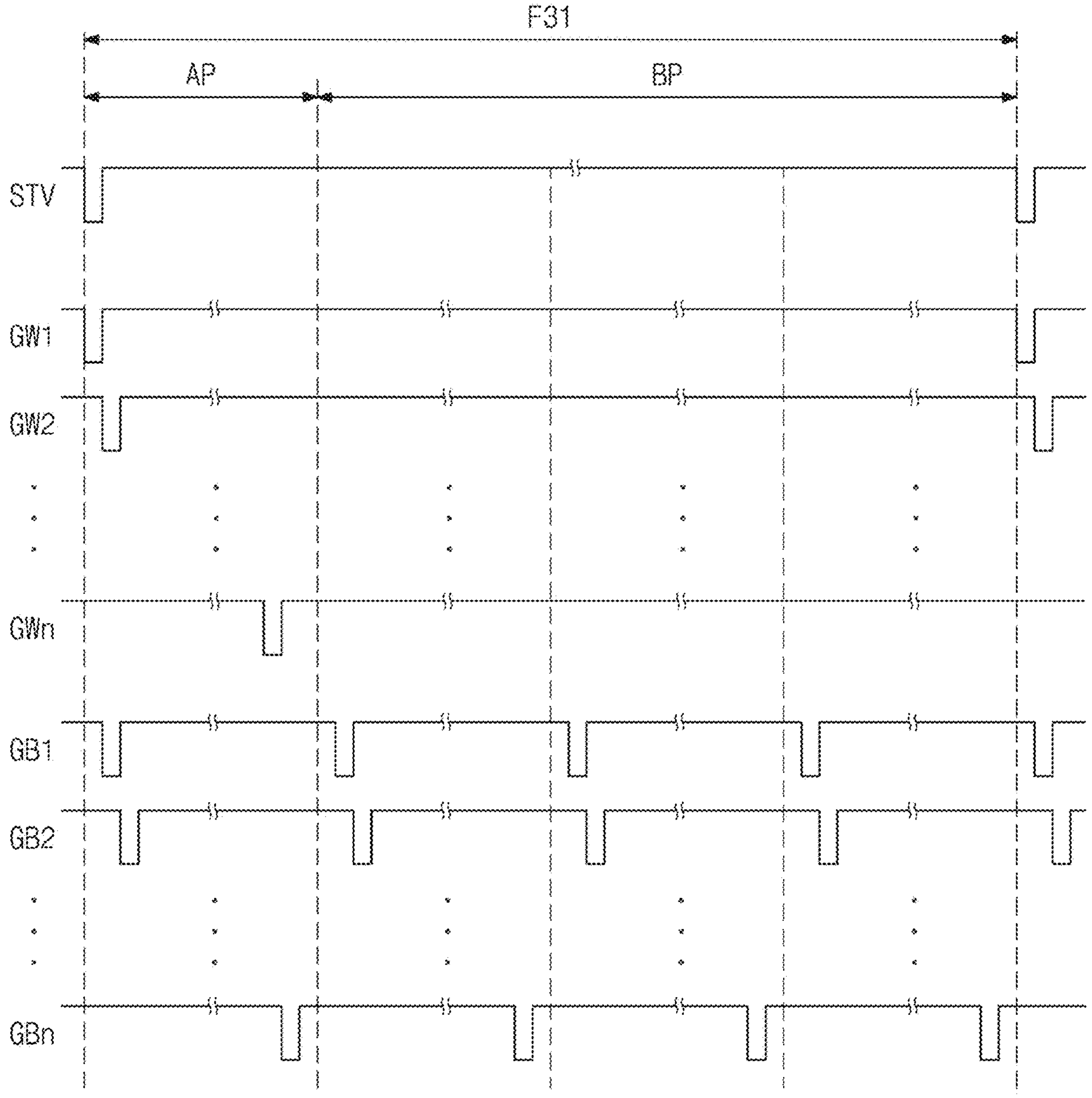

FIGS. 4A, 4B, and 4C are timing diagrams for describing an operation of a display device.

Referring to FIGS. 1, 2, 4A, 4B, and 4C, for convenience of description, it is described that the display device DD operates at a first frequency (e.g., 240 Hertz (Hz)), a second frequency (e.g., 120 Hz), and a third frequency (e.g., 60 Hz). However, the present disclosure is not limited thereto. The operating frequency of the display device DD may be changed in various manners. In an embodiment, the operating frequency of the display device DD may be selected as one of the first frequency, the second frequency, and the third frequency. Besides, the display device DD may not set the operating frequency to a specific frequency during an operation, but may change the operating frequency to one of the first to third frequencies at any time. In an embodiment, the operating frequency of the display device DD may be determined depending on the frequency of the input image signal RGB. In an embodiment, the operating frequency of the display device DD may be set to the maximum frequency, at which the display panel DP is capable of operating, regardless of the frequency of the input image signal RGB.

The driving controller 100 provides the scan control signal SCS to the scan driving circuit SD. The scan control signal SCS may include information about the operating frequency of the display device DD. The scan driving circuit SD may output the scan signals GC1 to GCn, GI1 to GIn, GW1 to GWn, and GB1 to GBn corresponding to operating frequencies in response to the scan control signal SCS. The scan control signal SCS may include a start signal STV. The start signal STV may be a signal indicating the start of one frame.

FIG. 4A is a timing diagram of a start signal and scan signals when an operating frequency of the display device DD is a first frequency (e.g., 240 Hz).

Referring to FIGS. 1 and 4A, when the operating frequency is the first frequency (e.g., 240 Hz), during each of frames F11, F12, F13, and F14, the scan driving circuit SD sequentially activates the scan signals GW1 to GWn to a low level and sequentially activates scan signals GB1 to GBn to a low level. Only the scan signals GW1 to GWn and the scan signals GB1 to GBn are shown in FIG. 4A. However, the scan signals GI1 to GIn and GC1 to GCn and the emission control signals EM1 to EMn may also be sequentially activated during each of the frames F11, F12, F13, and F14.

FIG. 4B is a timing diagram of a start signal and scan signals when an operating frequency of the display device DD is a second frequency (e.g., 120 Hz).

Referring to FIGS. 1 and 4B, when the operating frequency is the second frequency (e.g., 120 Hz), the duration of each of frames F21 and F22 may be twice the duration of each of the frames F11, F12, F13, and F14 shown in FIG. 4A. Each of the frames F21 and F22 may include one active section AP and one blank section BP. During the active section AP, the scan driving circuit SD sequentially activates the scan signals GW1 to GWn to a low level, and sequentially activates the scan signals GB1 to GBn to a low level. FIG. 4B illustrates only the scan signals GW1 to GWn and the scan signals GB1 to GBn. However, the scan signals GI1 to GIn and GC1 to GCn and the emission control signals EM1 to EMn may also be sequentially activated in the active section AP of each of the frames F21 and F22.

During the blank section BP, the scan driving circuit SD may maintain the scan signals GW1 to GWn at an inactive level (e.g., a high level) and may sequentially activate the scan signals GB1 to GBn.

Although not illustrated in FIG. 4B, the scan driving circuit SD may maintain the scan signals GI1 to GIn and GC1 to GCn at an inactive level (e.g., a high level) during the blank section BP. During the blank section BP, the emission driving circuit EDC may sequentially activate the emission control signals EM1 to EMn.

In the example shown in FIG. 4A described above, each of the frames F11, F12, F13, and F14 may correspond to an active period AP shown in FIG. 4B.

FIG. 4C is a timing diagram of a start signal STV and scan signals when an operating frequency of the display device DD is a third frequency (e.g., 60 Hz).

Referring to FIGS. 1 and 4C, when the operating frequency is the third frequency (e.g., 60 Hz), the duration of a frame F31 may be twice the duration of each of the frames F21 and F22 shown in FIG. 4B. The duration of the frame F31 may be four times the duration of each of the frames F11, F12, F13, and F14 shown in FIG. 4A.

The frame F31 may include one active period AP and one blank periods BP. During the active section AP, the scan driving circuit SD sequentially activates the scan signals GW1 to GWn to a low level, and sequentially activates the scan signals GB1 to GBn to a low level. FIG. 4C illustrates only the scan signals GW1 to GWn and the scan signals GB1 to GBn. However, the scan signals GI1 to GIn and GC1 to GCn and the emission control signals EM1 to EMn may also be sequentially activated in the active section AP of the frame F31.

During the blank section BP, the scan driving circuit SD may maintain the scan signals GW1 to GWn at an inactive level (e.g., a high level) and may sequentially activate the scan signals GB1 to GBn.

Although not illustrated in FIG. 4C, the scan driving circuit SD may maintain the scan signals GI1 to GIn and GC1 to GCn at an inactive level (e.g., a high level) during the blank section BP. During the blank section BP, the emission driving circuit EDC may sequentially activate the emission control signals EM1 to EMn.

Figure 5:
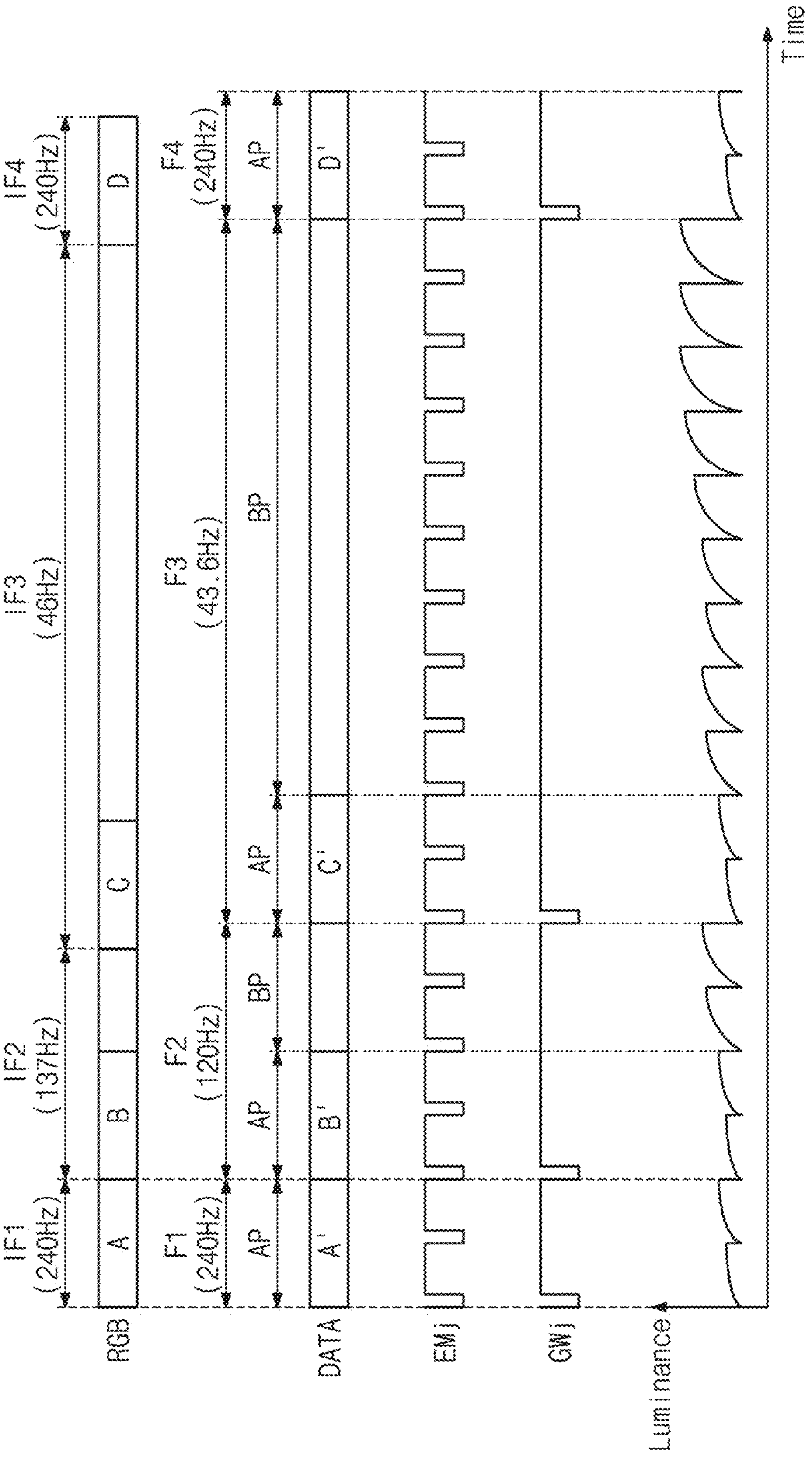
FIG. 5 is a timing diagram for describing an operation of a display device.

FIG. 5 is a timing diagram for describing an operation of a display device.

Referring to FIGS. 1 and 5, an operating frequency of the display device DD may be changed during each frame of the input image signal RGB. In the example shown in FIG. 5, the frequency of a first input frame IF1 is 240 Hz; the frequency of a second input frame IF2 is 137 Hz; the frequency of a third input frame IF3 is 46 Hz; and, the frequency of a fourth input frame IF4 is 240 Hz.

The driving controller 100 may detect the frequency of the input image signal RGB and then may convert the output image signal DATA having a frequency suitable for the display panel DP. For example, when frequencies in the first to fourth input frames IF1 to IF4 are is 240 Hz, 137 Hz, 46 Hz, and 240 Hz, respectively, the frequencies of the scan signal GWj in the first to fourth output frames F1 to F4 may be 240 Hz, 120 Hz, 43.6 Hz, and 240 Hz, respectively. The frequency of the emission control signal EMj is twice the maximum operating frequency. In an embodiment, when the maximum operating frequency of the display panel DP is 240 Hz, the emission control signal EMj may be 480 Hz.

The emission control signal EMj may also transition to the active level in the blank section of each frame.

Assuming that the input image signals RGB in the first to fourth input frames IF1 to IF4 are A, B, C, and D, respectively, the output image signals DATA in the first to fourth output frames F1 to F4 may be A', B', C', and D', respectively. In an embodiment, it is assumed that A', B', C', and D', which are the output image signals DATA during the first to fourth output frames F1 to F4, respectively, correspond to the same grayscale level.

The driving controller 100 provides the scan driving circuit SD with the scan control signal SCS suitable for the operating frequency. The scan driving circuit SD outputs the emission control signal EMj and the scan signal GWj in response to the scan control signal SCS.

In the example shown in FIG. 5, the emission control signal EMj is activated to a low level twice during one frame, and the scan signal GWj is activated to a low level once during one frame. The emission control signal EMj may be activated to a low level during not only the active section AP but also the blank section BP. The scan signal GWj may be maintained at a high level during the blank section BP.

As a time during which the gate-source voltage of the first transistor T1 is maintained at a constant level increases, the hysteresis characteristic of the first transistor T1 deteriorates. In the example shown in FIG. 5, as the blank section BP of the third output frame F3 increases, the hysteresis characteristic of the first transistor T1 deteriorates, and the luminance of the pixel PXij increases.

When the operating frequency of 43.6 Hz during the third output frame F3 is changed to 240 Hz during the fourth output frame F4, a difference in luminance may occur even though C', which is the output image signal DATA during the third output frame F3, have the same gray level as D', which is the output image signal DATA during the fourth output frame F4. When the difference in luminance between the third output frame F3 and the fourth output frame F4 is not less than a predetermined level, the difference in luminance may be perceived by a user.

Figure 6:
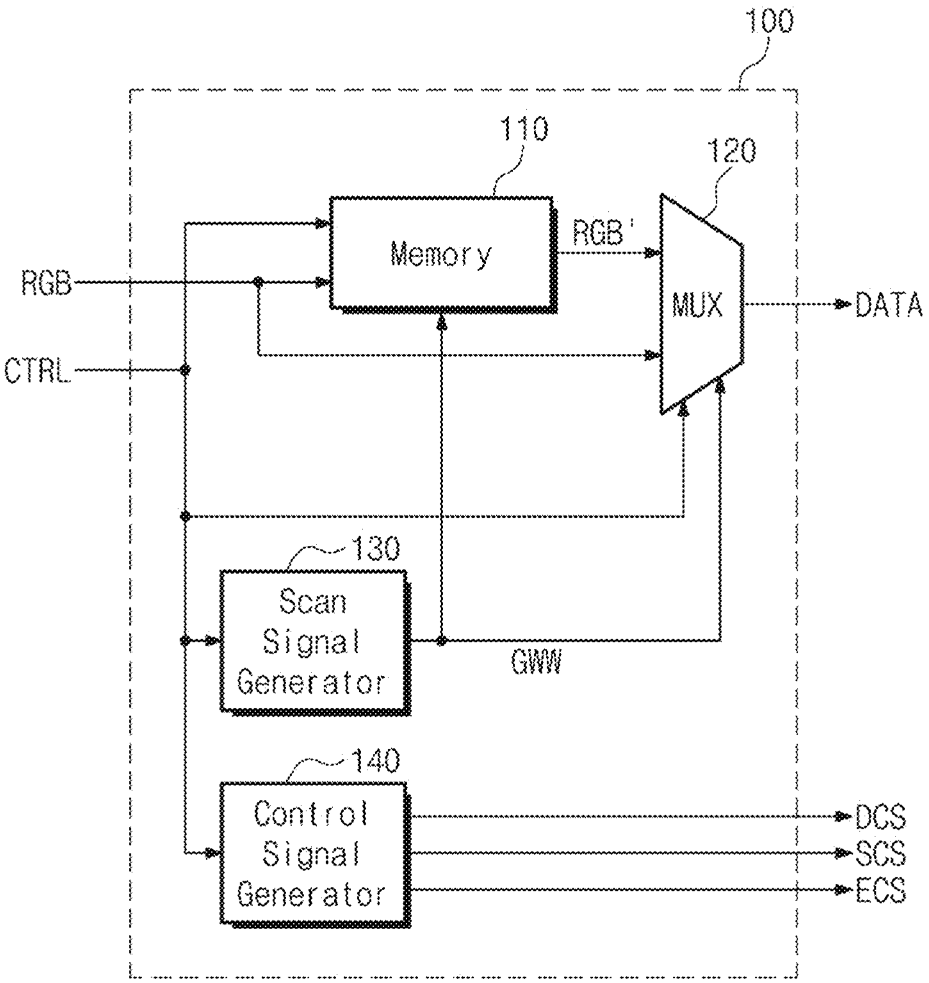
FIG. 6 is a block diagram of a driving controller, according to an embodiment.

FIG. 6 is a block diagram of a driving controller, according to an embodiment.

Figure 7:
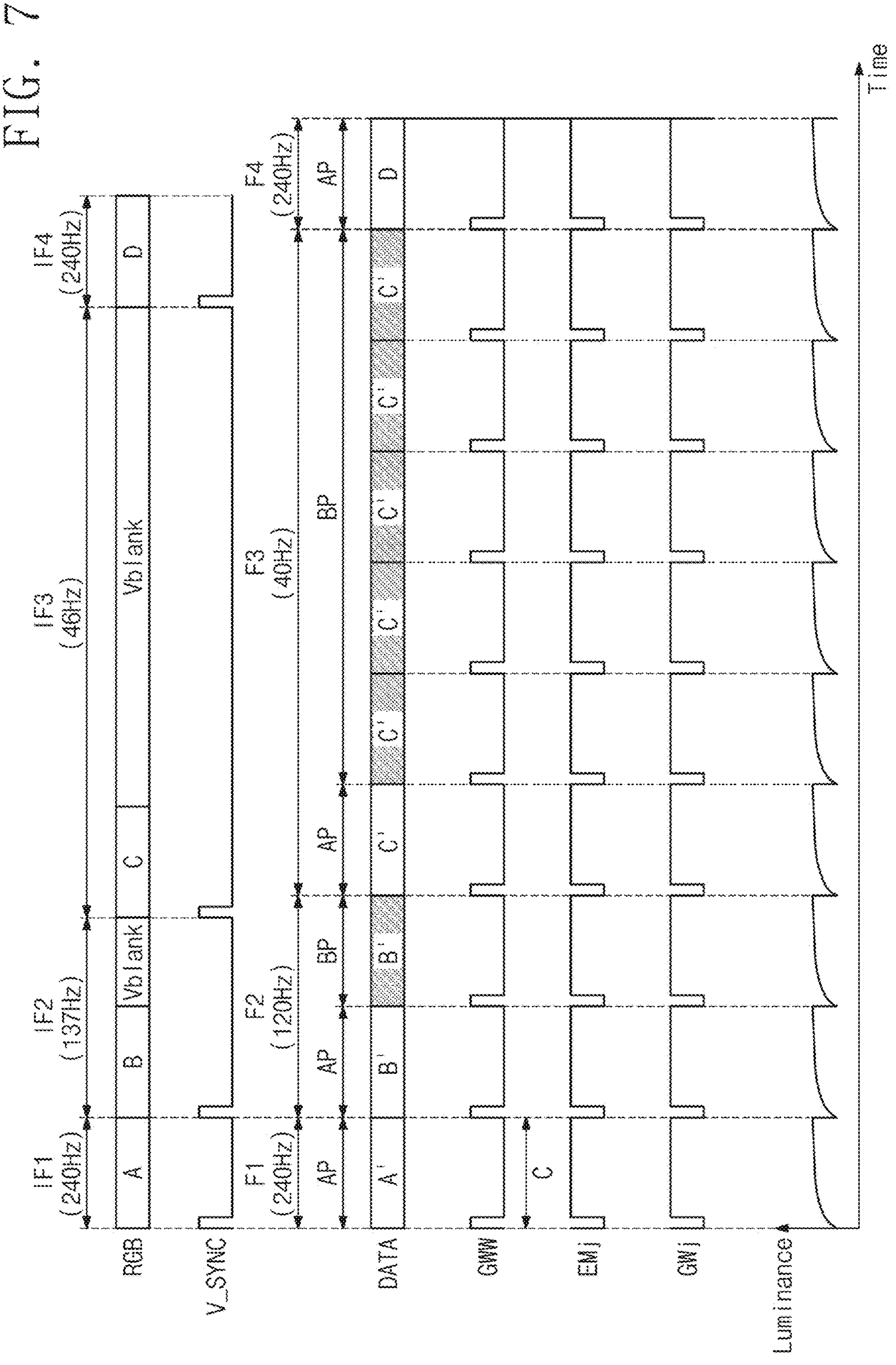
FIG. 7 is a timing diagram for describing an operation of a display device.

FIG. 7 is a timing diagram for describing an operation of a display device.

Referring to FIGS. 6 and 7, the driving controller 100 receives the input image signal RGB and the control signal CTRL from a host (not shown). The host may be one of various devices such as a main controller, a graphics controller, a graphics processing unit ("GPU"), or the like.

The driving controller 100 determines the frequency of the input image signal RGB, based on the input image signal RGB and the control signal CTRL and then outputs the output image signal DATA corresponding to the previous input image signal during a blank section of the input image signal RGB. Accordingly, even during the blank section of the input image signal RGB, the output image signal DATA may be provided to the display panel DP.

Moreover, the driving controller 100 may output the scan control signal SCS, the data control signal DCS, and the emission control signal ECS.

The driving controller 100 may include a memory 110, a multiplexer 120, a scan signal generator 130, and a control signal generator 140.

The memory 110 stores the input image signal RGB in response to the control signal CTRL. The control signal CTRL may include a vertical synchronization signal V_SYNC. The memory 110 may store the input image signal RGB in response to the vertical synchronization signal V_SYNC.

The scan signal generator 130 generates an internal scan signal GWW. In an embodiment, the scan signal generator 130 may generate the internal scan signal GWW in response to the vertical synchronization signal V_SYNC included in the control signal CTRL.

The memory 110 may output a storage image signal RGB' in response to the internal scan signal GWW. In other words, the memory 110 stores the input image signal RGB in response to the vertical synchronization signal V_SYNC and then outputs the stored image signal, that is, the storage image signal RGB', in response to the internal scan signal GWW.

The multiplexer 120 may output one of the input image signal RGB and the storage image signal RGB' received from the memory 110 as the output image signal DATA in response to the control signal CTRL and the internal scan signal GWW.

In an embodiment, when the control signal CTRL is at an active level, the multiplexer 120 outputs the input image signal RGB as the output image signal DATA. When the control signal CTRL is at an inactive level, and the internal scan signal GWW is at an active level, the multiplexer 120 outputs the storage image signal RGB' received from the memory 110 as the output image signal DATA.

The control signal generator 140 receives the control signal CTRL, and outputs the data control signal DCS, the scan control signal SCS, and the emission control signal ECS.

The control signal generator 140 may output the data control signal DCS, the scan control signal SCS and the emission control signal ECS such that the display panel DP operates at a preset operating frequency.

In an embodiment, the control signal generator 140 may output the data control signal DCS, the scan control signal SCS, and the emission control signal ECS such that the display panel DP operates at the maximum operating frequency among operable operating frequencies. For example, when the display panel DP is capable of operating at the maximum operating frequency of 240 Hz, the control signal generator 140 may output the data control signal DCS, the scan control signal SCS, and the emission control signal ECS such that the display panel DP operates at 240 Hz.

The output image signal DATA and the data control signal DCS may be provided to the data driving circuit 200 shown in FIG. 1. The scan control signal SCS may be provided to the scan driving circuit SD shown in FIG. 1. The emission control signal ECS may be provided to the emission driving circuit EDC shown in FIG. 1.

As shown in FIG. 7, the input image signal RGB may be entered in synchronization with the vertical synchronization signal V_SYNC included in the control signal CTRL. The frequency of the vertical synchronization signal V_SYNC may be variously changed for every input frame. FIG. 7 illustrates that the frequency of the vertical synchronization signal V_SYNC is sequentially changed to 240 Hz, 137 Hz, 46 Hz, and 240 Hz during the first to fourth input frames IF1 to IF4, respectively. However, the present disclosure is not limited thereto. The frequency of the vertical synchronization signal V_SYNC may be variously changed. Here, the frequency of the vertical synchronization signal V_SYNC of an input frame corresponds to the frequency of the input frame.

When the highest frequency of the vertical synchronization signal V_SYNC is 240 Hz, in the case where the frequency of the vertical synchronization signal V_SYNC is lower than 240 Hz, the input image signal RGB may include a blank section Vblank. The blank section Vblank of the input image signal RGB is an invalid data section and may include null data.

The driving controller 100 may generate the output image signal DATA, the data control signal DCS, the scan control signal SCS, and the emission control signal ECS such that the display panel DP operates at a frequency that is lower than or equal to the frequency of the vertical synchronization signal V_SYNC.

In an embodiment, when the frequency of the vertical synchronization signal V_SYNC is 240 Hz, the driving controller 100 may set the frequency of the display panel DP to 240 Hz. When the frequency of the vertical synchronization signal V_SYNC is 137 Hz, the driving controller 100 may set the frequency of the display panel DP to 120 Hz. When the frequency of the vertical synchronization signal V_SYNC is 46 Hz, the driving controller 100 may set the frequency of the display panel DP to 40 Hz.

The memory 110 stores the input image signal RGB when the vertical synchronization signal V_SYNC is at an active level (e.g., a high level). Accordingly, during the first input frame IF1, the memory 110 may store A that is the input image signal RGB.

The scan signal generator 130 generates the internal scan signal GWW in response to the vertical synchronization signal V_SYNC. In an embodiment, the scan signal generator 130 may generate the internal scan signal GWW having a preset frequency regardless of the vertical synchronization signal V_SYNC.

When the vertical synchronization signal V_SYNC is at the active level, the multiplexer 120 outputs the input image signal RGB as the output image signal DATA. Accordingly, during the active section AP of the first output frame F1, the output image signal DATA output from the driving controller 100 may be A' corresponding to A that is the input image signal RGB.

The data driving circuit 200 illustrated in FIG. 1 may output the data signal Di in response to the output image signal DATA and the data control signal DCS; the scan driving circuit SD may output the scan signal GWj in response to the scan control signal SCS; and, the emission driving circuit EDC may output the emission control signal EMj in response to the emission control signal ECS. Accordingly, the pixel PXij illustrated in FIG. 2 may display an image corresponding to A' that is the output image signal DATA during the first output frame F1.

FIG. 7 illustrates only the emission control signal EMj and the scan signal GWj. The scan signals GIj and GCj may also have the same frequency as the scan signal GWj.

Successively, the driving controller 100 operates during the active section AP of the first output frame F1 so as to be the same as during the active section AP of the second output frame F2. That is, the output image signal DATA output from the driving controller 100 may be B' corresponding to B that is the input image signal RGB.

The blank section BP of the second output frame F2 corresponds to the blank section Vblank of the input image signal RGB. Because the vertical synchronization signal V_SYNC during the blank section Vblank of the input image signal RGB is maintained at an inactive level (i.e., a low level), the multiplexer 120 outputs the storage image signal RGB' received from the memory 110 as the output image signal DATA in response to the internal scan signal GWW having an active level (i.e., a high level). The output image signal DATA may be B' during the blank section BP of the second output frame F2 so as to be the same as during the active section AP of the second output frame F2.

The driving controller 100 operates during the active section AP of the third output frame F3 so as to be the same as during the active section AP of the first output frame F1. That is, the output image signal DATA output from the driving controller 100 may be C' corresponding to C that is the input image signal RGB.

The blank section BP of the third output frame F3 corresponds to the blank section Vblank of the input image signal RGB. Because the vertical synchronization signal V_SYNC during the blank section Vblank of the input image signal RGB is maintained at an inactive level (i.e., a low level), the multiplexer 120 outputs the storage image signal RGB' received from the memory 110 as the output image signal DATA in response to the internal scan signal GWW having an active level (i.e., a high level). The output image signal DATA may be C' during the blank section BP of the third output frame F3 so as to be the same as during the active section AP of the third output frame F3. Also, whenever the internal scan signal GWW transitions to the active level during the blank section BP of the third output frame F3, the multiplexer 120 outputs the storage image signal RGB' received from the memory 110 as the output image signal DATA. Accordingly, the frequency of the vertical synchronization signal V_SYNC during the third output frame F3 is 46 Hz. However, the display panel DP may display an image at 240 Hz.

As described above, as a time during which the gate-source voltage of the first transistor T1 (see FIG. 1) is maintained at a constant level increases, the hysteresis characteristic of the first transistor T1 deteriorates. In the example shown in FIG. 5, as the blank section BP of the third output frame F3 increases, the hysteresis characteristic of the first transistor T1 deteriorates, and the luminance of the pixel PXij increases. When the operating frequency of 43.6 Hz during the third output frame F3 is changed to 240 Hz during the fourth output frame F4, a difference in luminance may occur even though C', which is the output image signal DATA during the third output frame F3, have the same gray level as D', which is the output image signal DATA during the fourth output frame F4.

Returning to FIG. 7, the frequency of the input image signal RGB may be changed to 240 Hz, 137 Hz, 46 Hz, or 240 Hz during the first to fourth input frames IF1 to IF4. In this case, the driving controller 100 may set the operating frequency of the display panel DP to 240 Hz during the first output frame F1; the driving controller 100 may set the operating frequency of the display panel DP to 120 Hz during the second output frame F2; the driving controller 100 may set the operating frequency of the display panel DP to 40 Hz during the third output frame F3; and, the driving controller 100 may set the operating frequency of the display panel DP to 240 Hz during the fourth output frame F4. However, the emission control signal EMj and the scan signal GWj are activated during not only the active section AP but also the blank section BP, and thus the actual operating frequency of each of the emission control signal EMj and the scan signal GWj is 240 Hz.

The pixel PXij receives the output image signal DATA at a frequency of 240 Hz, thereby preventing the hysteresis characteristic of the first transistor T1 (see FIG. 2) from deteriorating. Accordingly, as shown in FIG. 7, the luminance of the display panel DP may be maintained at a constant level.

FIGS. 8A and 8B are diagrams illustrating the number of cycles in one frame and a period of one frame according to the frequency of an output frame.

FIG. 8A illustrates the number of cycles in one frame and a period of one frame according to the frequency of an output frame when the maximum operating frequency of the display panel DP (see FIG. 1) is 240 Hz.

Referring to FIGS. 7 and 8A, when a frequency of the first output frame F1 is 240 Hz, the number of cycles (C) during the first output frame F1 is 1, and the period of the first output frame F1 is 4.166666667 microseconds (ms).

When a frequency of the second output frame F2 is 120 Hz, the number of cycles (C) during the second output frame F2 is 2, and the period of the second output frame F2 is 8.333333333 ms.

When a frequency of the third output frame F3 is 40 Hz, the number of cycles (C) during the third output frame F3 is 6, and the period of the third output frame F3 is 25 ms.

FIG. 8B illustrates the number of cycles in one frame and a period of one frame according to the frequency of an output frame when the maximum operating frequency of the display panel DP (see FIG. 1) is 480 Hz.

For example, when a frequency of the output frame is 480 Hz, the number of cycles (C) during the output frame is 1, and the period of the output frame is 2.08333333 ms. When a frequency of the output frame is 80 Hz, the number of cycles (C) during the output frame is 6, and the period of the output frame is 12.5 ms.

As such, the number of cycles during one frame and the period of one frame may be determined depending on the maximum operating frequency of the display panel DP (see FIG. 1) and the frequency of the output frame.

Figure 9:
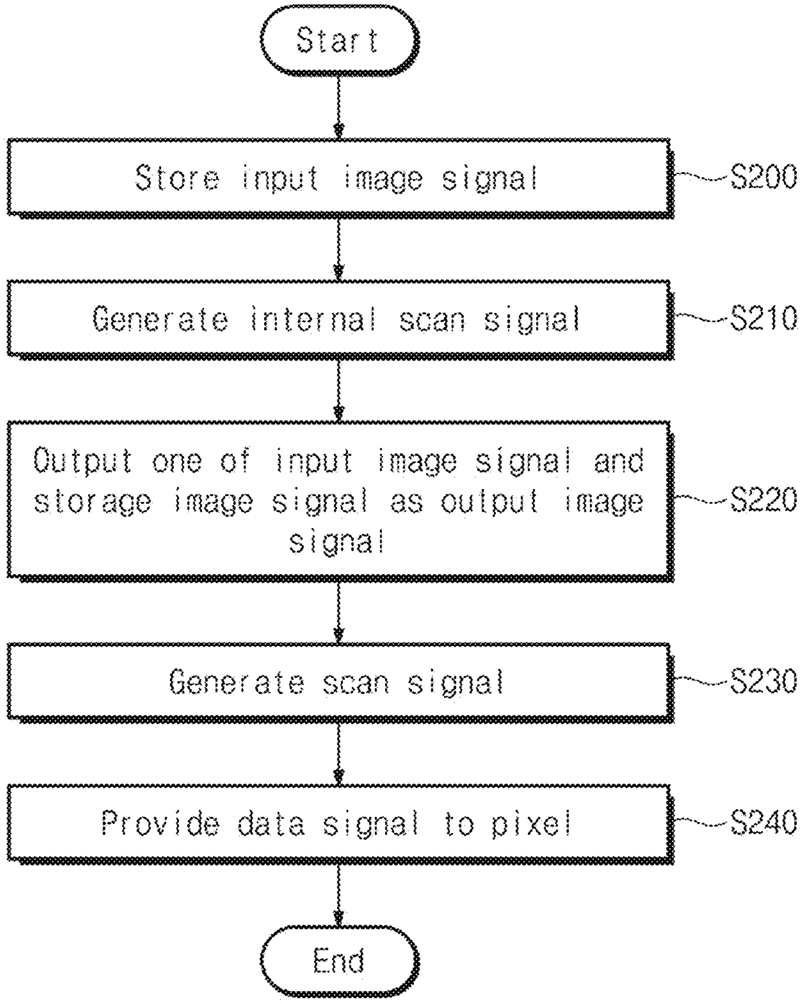
FIG. 9 is a flowchart illustrating a method of driving a display device, according to an embodiment of the present disclosure.

FIG. 9 is a flowchart illustrating a method of driving a display device, according to an embodiment of the present disclosure.

For convenience of description, a method of driving a display device will be described with reference to the display device of FIG. 1 and the driving controller of FIG. 6, but the present disclosure is not limited thereto.

Referring to FIGS. 1, 6, and 9, the driving controller 100 of the display device DD stores the input image signal RGB in the memory 110 in response to the control signal CTRL (operation S200).

The scan signal generator 130 of the driving controller 100 generates the internal scan signal GWW in response to the control signal CTRL (operation 210).

The multiplexer 120 of the driving controller 100 outputs one of the input image signal RGB and the storage image signal RGB' received from the memory 110 as the output image signal DATA in response to the control signal CTRL and the internal scan signal GWW (operation 220).

The control signal generator 140 of the driving controller 100 outputs the scan control signal SCS in response to the control signal CTRL.

The scan driving circuit SD generates a scan signal in response to the scan control signal SCS, and provides the scan signal to the pixel PX (operation S230). Here, the scan signal may include a plurality of scan signals.

The data driving circuit 200 provides the data signal Di corresponding to the output image signal DATA to the pixel PX (operation S240). Although an embodiment of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

When a frequency of an input video signal is changed, a driving controller having such a configuration outputs image data signals and control signals such that an image is displayed at an optimal frequency among operable operating frequencies. Accordingly, the display device may display an image at the optimal frequency regardless of the frequency of an input image signal. Accordingly, it is possible to effectively prevent a change in luminance according to a change in frequency of the input image signal.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. A driving controller comprising:
- a memory, which stores an input image signal in response to a control signal;
- a scan signal generator, which outputs an internal scan signal in response to the control signal; and
- a multiplexer, which outputs one of the input image signal and a storage image signal as an output image signal in response to the control signal and the internal scan signal, wherein the storage image signal is provided from the memory,
- wherein the memory outputs the storage image signal in response to the internal scan signal,
- wherein the control signal includes a vertical synchronization signal, and
- wherein the scan signal generator outputs the internal scan signal in response to the vertical synchronization signal.

2. The driving controller of claim 1, wherein a frequency of the internal scan signal is different from a frequency of the control signal.

3. The driving controller of claim 1, wherein a frequency of the internal scan signal is higher than a frequency of the control signal.

4. The driving controller of claim 1, wherein a frequency of a first input frame of the input image signal is different from a frequency of a second input frame of the input image signal successive to the first input frame.

5. The driving controller of claim 4, wherein the internal scan signal has a predetermined frequency.

6. The driving controller of claim 1, wherein the multiplexer outputs the input image signal as the output image signal when the control signal is at an active level, and outputs the storage image signal received from the memory as the output image signal when the control signal is at an inactive level and the internal scan signal is at an active level.

7. A display device comprising:
- a display panel including a pixel;
- a driving controller, which receives a control signal and an input image signal and outputs an output image signal, a first control signal, and a second control signal;
- a data driving circuit, which outputs a data signal to the pixel in response to the output image signal and the first control signal;
- an emission driving circuit, which outputs an emission control signal; and
- a scan driving circuit, which outputs a scan signal to the pixel in response to the second control signal, wherein the driving controller includes:

a memory, which stores the input image signal in response to the control signal;

a scan signal generator, which outputs an internal scan signal in response to the control signal; and a multiplexer, which outputs one of the input image signal and a storage image signal as an output image signal in response to the control signal and the internal scan signal, wherein the storage image signal is provided from the memory, and wherein the memory outputs the storage image signal in response to the internal scan signal, wherein the scan signal includes a plurality of scan signals, and the scan driving circuit outputs the plurality of scan signals to the pixel in response to the second control signal.

8. The display device of claim 7, wherein a frequency of the internal scan signal is different from a frequency of the control signal.

9. The display device of claim 7, wherein the control signal includes a vertical synchronization signal, and wherein the scan signal generator outputs the internal scan signal in response to the vertical synchronization signal.

10. The display device of claim 9, wherein a frequency of a first input frame of the input image signal is different from a frequency of a second input frame of the input image signal successive to the first input frame.

11. The display device of claim 10, wherein, when a frequency of the second input frame is lower than a frequency of the first input frame, the input image signal of the second input frame includes a blank section.

12. The display device of claim 7, wherein the multiplexer outputs the input image signal as the output image signal, when the control signal is at an active level, and outputs the storage image signal received from the memory as the output image signal when the control signal is at an inactive level and the internal scan signal is at an active level.

13. The display device of claim 7, wherein a frequency of the scan signal output from the scan driving circuit is identical to a frequency of the internal scan signal output from the scan signal generator.

14. The display device of claim 7, wherein the pixel includes:

a light emitting element;

a first capacitor connected between a first driving voltage line and a first node;

a second capacitor between the first node and a second node;

a first transistor including a first electrode connected to the first driving voltage line, a second electrode electrically connected to the light emitting element, and a gate electrode connected to the second node;

a second transistor including a first electrode connected to a data line which delivers the data signal, a second electrode connected to the first electrode of the first transistor, and a gate electrode which receives a first scan signal among the plurality of scan signals; and a third transistor including a first electrode connected to the second electrode of the first transistor, a second electrode connected to the second node, and a gate electrode which receives a second scan signal among the plurality of scan signals.

15. A method of driving a display device, the method comprising:

storing an input image signal in a memory in response to a control signal;

generating an internal scan signal in response to the control signal;

outputting one of the input image signal and a storage image signal as an output image signal in response to the control signal and the internal scan signal, wherein the storage image signal is provided from the memory;

generating a scan signal and providing the scan signal to a pixel; and providing the pixel with a data signal corresponding to the output image signal, wherein the memory outputs the storage image signal in response to the internal scan signal, wherein the control signal includes a vertical synchronization signal, and wherein a frequency of a first input frame of the input image signal is different from a frequency of a second input frame of the input image signal successive to the first input frame.

16. The method of claim 15, wherein a frequency of the internal scan signal is different from a frequency of the control signal.

17. The method of claim 15, wherein a frequency of the scan signal is identical to a frequency of the internal scan signal output from a scan signal generator.

* * * * *